US012655584B2

(12) United States Patent
Vishtal et al.

(10) Patent No.: US 12,655,584 B2
(45) Date of Patent: Jun. 16, 2026

(54) MULTI-LAYER METALLIZED PAPER-BASED PACKAGING MATERIAL

(71) Applicant: SOCIETE DES PRODUITS NESTLE S.A., Vevey (CH)

(72) Inventors: Alexey Vishtal, Lausanne (CH); Abhijit Bhattacharya, Epalinges (CH)

(73) Assignee: Societe des Produits Nestle S.A., Vevey (CH)

( * ) Notice: Subject to any disclaimer, the term of this patent is extended or adjusted under 35 U.S.C. 154(b) by 576 days.

(21) Appl. No.: 18/006,945

(22) PCT Filed: Jul. 16, 2021

(86) PCT No.: PCT/EP2021/069961
§ 371 (c)(1),
(2) Date: Jan. 26, 2023

(87) PCT Pub. No.: WO2022/023077
PCT Pub. Date: Feb. 3, 2022

(65) Prior Publication Data
US 2023/0272584 A1      Aug. 31, 2023

(30) Foreign Application Priority Data

Jul. 29, 2020      (EP) .................................... 20188363

(51) Int. Cl.
B32B 15/082        (2006.01)
B32B 27/08        (2006.01)
(Continued)

(52) U.S. Cl.
CPC .......... D21H 19/82 (2013.01); B32B 15/082 (2013.01); B32B 27/08 (2013.01); B32B 27/10 (2013.01);
(Continued)

(58) Field of Classification Search
CPC ...... D21H 19/08; D21H 19/82; B32B 15/082; B32B 27/10; B32B 27/30; B32B 27/306; B32B 27/308
See application file for complete search history.

(56) References Cited

U.S. PATENT DOCUMENTS

| 5,827,616 A | * | 10/1998 | Girard | .................... | D21H 27/10 |
| | | | | | 427/361 |
| 2011/0132975 A1 | * | 6/2011 | Toft | ........................ | B32B 27/18 |
| | | | | | 428/323 |

(Continued)

FOREIGN PATENT DOCUMENTS

| CN | 108290370 A | 7/2018 |
| KR | 101739363 B1 | 5/2017 |

(Continued)

OTHER PUBLICATIONS

Li et al., "Chemical Analysis of Tobacco Materials", May 31, 2020, p. 51.

(Continued)

*Primary Examiner* — Michael C. Romanowski
(74) *Attorney, Agent, or Firm* — K&L Gates LLP

(57)        ABSTRACT
The present invention relates generally to the field of multi-layer packaging material. In particular, the present invention relates to a multi-layer metallized paper-based packaging material comprising a paper layer, a pre metallization coating layer, a metallized layer, and at least one post metallization coating layer. The present invention further relates to the use of the multi-layer metallized paper-based packaging material in accordance with the present invention to package food and to a food package manufactured from the multi-layer metallized paper-based packaging material. In one embodiment of the present invention the multi-layer metal-
(Continued)

Paper layer

Pre-metallization coating layer

Metal layer

First layer of post-metallization coating

Second layer of post-metallization coating lized paper-based packaging material can be recycled with other paper packaging materials.

11 Claims, 2 Drawing Sheets

(51) Int. Cl.

| | |
|---|---|
| *B32B 27/10* | (2006.01) |
| *B32B 27/20* | (2006.01) |
| *B32B 27/30* | (2006.01) |
| *B65D 65/42* | (2006.01) |
| *D21H 19/08* | (2006.01) |
| *D21H 19/82* | (2006.01) |
| *D21H 27/10* | (2006.01) |

(52) U.S. Cl.
CPC ............ *B32B 27/20* (2013.01); *B32B 27/306* (2013.01); *B32B 27/308* (2013.01); *D21H 19/08* (2013.01); *D21H 27/10* (2013.01); *B32B 2307/538* (2013.01); *B32B 2307/7244* (2013.01); *B32B 2307/7246* (2013.01); *B65D 65/42* (2013.01)

(56) References Cited

U.S. PATENT DOCUMENTS

| | | | | |
|---|---|---|---|---|
| 2011/0229722 A1* | 9/2011 | Rivett | .................. | B29C 48/495 |
| 2012/0100320 A1* | 4/2012 | Toft | ....................... | B32B 27/32 |
| | | | | 428/464 |
| 2013/0101831 A1* | 4/2013 | Knoerzer | .............. | D21H 19/38 |
| | | | | 427/326 |
| 2013/0101855 A1* | 4/2013 | Cham | ................... | B32B 29/002 |
| | | | | 428/512 |
| 2019/0202191 A1* | 7/2019 | Toft | .......................... | B32B 5/18 |
| 2020/0370244 A1* | 11/2020 | Becker | .................. | D21H 17/60 |

FOREIGN PATENT DOCUMENTS

| | | | | |
|---|---|---|---|---|
| WO | 9613380 | 5/1996 | | |
| WO | 0024967 | 5/2000 | | |
| WO | WO-0024967 A1 * | 5/2000 | ............ | B05D 5/067 |
| WO | 0077300 | 12/2000 | | |
| WO | WO-0077300 A1 * | 12/2000 | ............ | D21H 19/02 |
| WO | 2012175621 A1 | 12/2012 | | |
| WO | 2013041469 A1 | 3/2013 | | |
| WO | WO-2019063560 A1 * | 4/2019 | ............ | D21H 17/53 |
| WO | 2021165290 A1 | 8/2021 | | |

OTHER PUBLICATIONS

Zhao, "Food Process Engineering", Apr. 30, 2020, p. 167.

Office Action Received for Application No. CN202180061045.8, mailed on Apr. 27, 2024, 12 Pages(6 Pages of English Translation and 6 Pages of Official Copy).

European Office Action for Appl No. 21 746 006.2-1102 dated Aug. 6, 2024, 4 pages.

\* cited by examiner

Figure 1:

| Over Print Varnish |
| Printing |
| Paper |
| Pre-Metallization Coating |
| Metallization |
| First Layer of Post-Metallization Coating |
| Second Layer of Post-Metallization Coating |

MULTI-LAYER METALLIZED PAPER-BASED PACKAGING MATERIAL

CROSS REFERENCE TO RELATED APPLICATIONS

The present application is a National Stage of International Application No. PCT/EP2021/069961, filed on Jul. 16, 2021, which claims priority to European Patent Application No. 20188363.4, filed on Jul. 29, 2020, the entire contents of which are being incorporated herein by reference.

FIELD OF THE INVENTION

The present invention relates generally to the field of multi-layer packaging material. In particular, the present invention relates to a multi-layer metallized paper-based packaging material comprising a paper layer, a pre metallization coating layer, a metallized layer, and at least one post metallization coating layer. The present invention further relates to the use of the multi-layer metallized paper-based packaging material in accordance with the present invention to package food and to a food package manufactured from the multi-layer metallized paper-based packaging material. In one embodiment of the present invention the multi-layer metallized paper-based packaging material can be recycled with other paper packaging and non-packaging materials.

BACKGROUND OF THE INVENTION

Plastic packaging is used frequently in the economy and in people's daily lives. It has multiple advantages, such as its flexibility and its light weight. Such a weight reduction contributes to fuel saving and $CO_2$ reduction during transport, for example. Its barrier properties help to reduce food waste due a positive effect on increasing shelf life. The barrier properties also help to secure food safety.

However, according to the European strategy for plastics in a circular economy, recently published by the European Commission, around 25.8 million tons of plastic waste are generated in Europe every year with less than 30% of such waste being collected for recycling and between 150 000 to 500 000 tons of plastic waste entering the oceans every year.

To ensure that plastic waste is reduced, significant efforts are made in the industry and in commerce. Several supermarkets replace plastic bags by paper-based bags, for example. However, replacing plastics with paper in food packaging is not an easy task. A change in packaging material must not compromise consumer safety. The packaging must serve to protect the food but must also be robust enough to be handled by machines during the production process and must allow that the food product is protected effectively.

Therefore, multilayer packaging materials have been developed which include a paper or cardboard layer, and one or several layers of plastic or metal films, which provide robustness as well as barrier properties, especially to oxygen and moisture.

When manufacturing multilayer packaging material structures today, applying a layer of plastic by known techniques, in particular extrusion (extrusion-lamination or extrusion-coating), or similarly by an adhesive lamination process, necessarily provides a high thickness of the plastic film thus obtained onto the paper.

The second issue with extruded polymers in multilayer structures as described above, is that even for low thicknesses of polymer applied to the substrate, the cohesive strength of the polymer film is very high and the level of adhesion of the polymer to the paper or cardboard (i.e. cellulosic) substrate is also high. This prevents such polymer to detach from the substrate when recycled, and prevents recycling and repulping of the cellulosic fiber portion in a paper-stream recycling process.

Therefore, later during the recycling process, the multilayer structure comprising a mixture of paper and plastic (polymer) films either extruded (by classic techniques as extrusion-lamination or extrusion coating) or adhesive-laminated, cannot be recycled in a paper-stream recycling process because the plastic layer is too thick to be dispersed and at the same time the same layer has cohesion strength and adhesion level to the adjacent layers of the structure, which are way too high to be separated from the other layers of materials, especially from the paper fibres. The extruded plastic film remains intact within the paper pulp bath, hence making it difficult to recycle paper pulp from the repulping process.

More than that, the recycling process of known laminated materials described above is expensive, and energy consuming and characterized with relatively low yield of paper fibres that are recycled (around 60% from the total amount of packaging materials in the entire structure), hence, not sufficiently environmentally friendly from a disposal and recycling perspective. There is also room for improving the recyclability of the rest of the packaging material (i.e. the plastic polymer and the metal parts (e.g. aluminium parts).

Hence, there is a need for paper-based materials with improved barrier properties and better recycling credentials. There is—in particular—a need for paper-based materials with improved barrier properties that do not include a thick plastic film layer, to allow easier sorting and separation of the paper-based material during recycling.

WO 2000/076862 A9 describes in this respect a laminate structure for packaging applications comprising a paper substrate, and at least one polymer/nanoclay composite layer having clay particles with a thickness ranging from 0.7 to 9 nanometres applied to said paper substrate with an extrusion or lamination process.

Similarly, WO 2000/077300 A1 and WO 1996/013380 A1 disclose multilayer packaging materials wherein thick plastic layers are either extruded, co-extruded or laminated to a cellulosic layer.

There is still a need in the art to even further improve the barrier and recyclability properties of such paper-based packaging materials. Especially, there is a need for a packaging material that can be easily recycled in the recycling stream for paper or cardboard.

Furthermore, for packaging intended for food products, good barrier properties are essential for maintaining the safety and quality of packaged foods. Typically, such barrier properties include gas permeability, for example $O_2$, $CO_2$, and $N_2$, vapor permeability, for example water vapor, liquid permeability, for example water or oil, aroma permeability and light permeability.

One way to provide good barrier for paper-based packaging materials is the introduction of a metal layer. Indeed, currently metallized paper-materials are available on the market as alternatives to state-of-the-art multilayer packaging.

Problematic with the introduction of a metal layer in paper-based packaging material is the sensitivity of the metal layer to mechanical stress as well as poor smoothness and high porosity of paper materials. Mechanical stress can—for example—easily result in a loss of the required barrier properties that the metallized packaging material should provide. This may be due to loss of integrity of metal and metal oxide layers generated during the deposition process.

It would therefore be desirable to provide the art with a multi-layer metallized paper-based packaging material that exhibits sufficient barrier properties—in particular when subjected to mechanical stress and that is easy to recycle in the paper recycling processes; with a use of such a multi-layer metallized paper-based packaging material for packaging food products and with food packaging made from such a multi-layer metallized paper-based packaging material.

Any reference to prior art documents in this specification is not to be considered an admission that such prior art is widely known or forms part of the common general knowledge in the field.

SUMMARY OF THE INVENTION

The objective of the present invention is to enrich or improve the state of the art and in particular to provide a multi-layer metallized paper-based packaging that provides sufficient barrier properties to package food products also under mechanical stress and that is easier to recycle; to provide the use of such a multi-layer metallized paper-based packaging to package dry food products, or to at least to provide a useful alternative to packaging solutions existing in the art.

Vacuum deposited metallic layers are used in the art typically for visual appearance and are—hence—often found in luxury packaging, for example for alcoholic beverages, tobacco or cosmetics.

Aluminium coatings are further used to coat plastic films, for example, to reduce oxygen and water vapour transmission.

However, to the inventor's best knowledge, metallized paper-based packaging materials, that are easy to recycle and that have excellent barrier properties, even when subjected to mechanical stress, so that these packaging materials are suitable for food products are not known to the art.

The present inventors were surprised to see that by applying to a paper-based and metallized packaging material at least one post metallization coating layer on top of the metallized layer it was possible to achieve the objective of the present invention.

Particularly good results were obtained when the at least one post metallization coating layer comprised:

a post-metallization tie layer coating comprising an ethylene acrylic acid copolymer dispersion and
a post-metallization coating comprising plain or mineral filled ethylvinyl, butylvinyl or polyvinylalcohol copolymers applied on top of the post-metallization tie layer coating.

In particular, the use of butylvinylalcohol (BVOH) in the pre-metallization, and/or in the post-metallization coating (s), provides excellent properties of biodegradability, and especially allows the packaging material to be compostable according to the EN 17427 (2000) standard on "home compostability".

Consequently, the objective of the present invention is achieved by the subject matter of the independent claims. The dependent claims further develop the concept of the present invention.

Accordingly, the present invention provides a multi-layer metallized paper-based packaging material comprising a paper layer, a pre metallization coating layer, a metallized layer, and at least one post metallization coating layer.

The present invention further provides a use of a multi-layer metallized paper-based packaging material in accordance with the present invention to package food.

As used in this specification, the words "comprises", "comprising", and similar words, are not to be interpreted in an exclusive or exhaustive sense. In other words, they are intended to mean "including, but not limited to".

BRIEF DESCRIPTION OF THE DRAWINGS

Additional features and advantages of the present invention are described in, and will be apparent from, the description of the presently preferred embodiments which are set out below with reference to the drawings in which:

FIG. 1 shows a schematic representation of the multi-layer metallized paper structure;

DETAILED DESCRIPTION OF THE INVENTION

Figure 2:
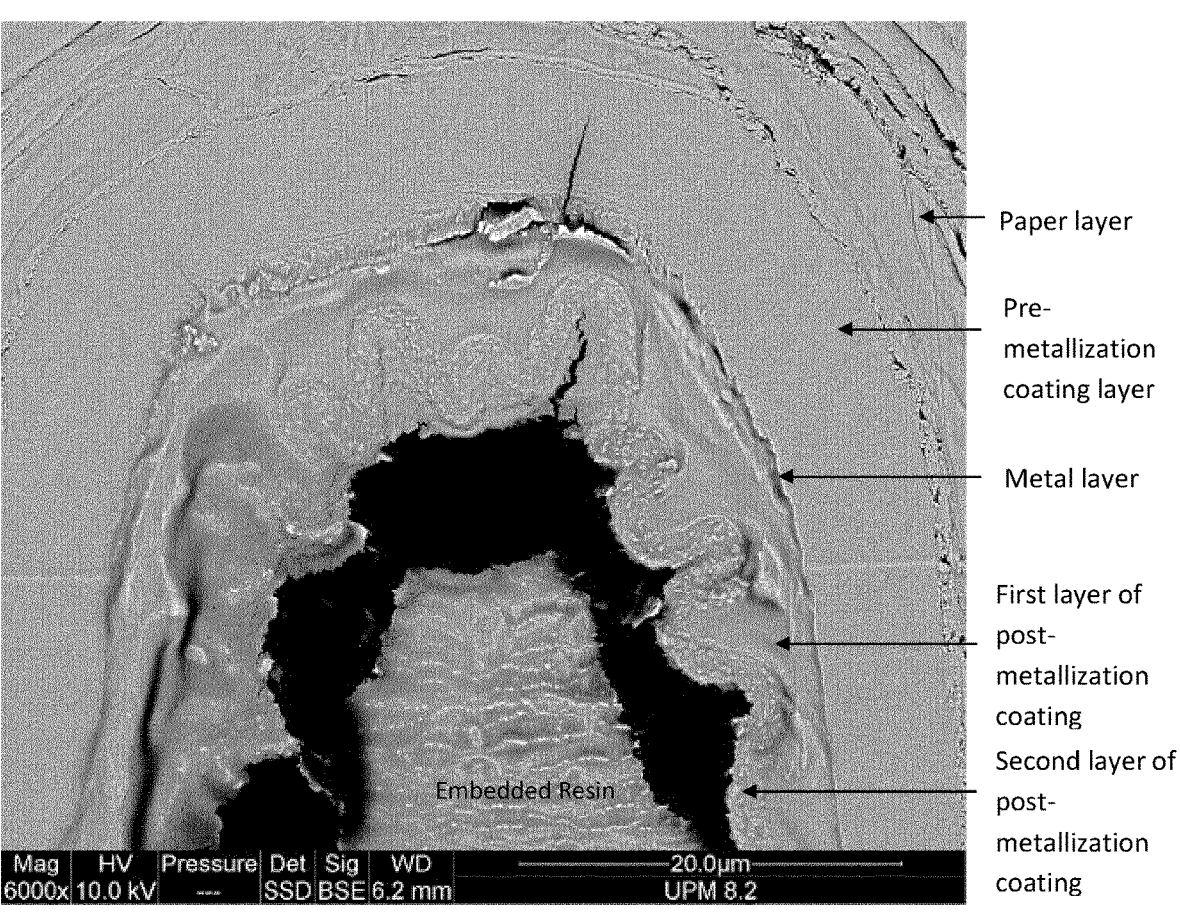
FIG. 2 shows a scanning electron microscopic image of the cross section of the multi-layer metallized paper structure after folding.

The present invention relates in part to a multi-layer metallized paper-based packaging material comprising, from its outer side (i.e. the surface outside of the packaging) to its inner side (i.e. the side in contact with the product to be enclosed in the package):

a paper layer,
a pre metallization coating layer
a metallized layer, and
at least one post metallization coating layer.

The pre-metallization dispersion coating layer allows to smoothen the surface of the paper and close the so-called "pin holes" which if present would lead to barrier loss after vacuum metallization, and instead improves the barrier properties and prepares for the metal atoms to be deposited on the surface of paper. The smoother (i.e. more even) is the surface of the paper, the more homogeneous is the metal layer. The physical vapor deposition process (metallization) is a line of sight application: if the surface that needs to be metallized has an uneven surface topography, the metal atoms cannot be deposited inside the crevasses (valleys/holes) that are present at the surface of the paper, which therefore results into poor packing of the metal flakes which finally causes loss in barrier properties. The pre-metallization layer itself also provides, to some extent, moderate oxygen barrier (OTR) and moisture barrier (WVTR). Furthermore pre-metallization coating acts as a flexible interface between paper and the metallization layer, thus improving mechanical resilience of the metal layer. It also protects metal from oxidation and direct interaction with water vapour.

The metallization layer provides moisture barrier (WVTR), and oxygen barrier (OTR) in combination with the pre-metallization dispersion coating.

The post-metallization layer provides oxygen barrier (OTR), as well as heat seal functionality and protection of the metal layer from physical damages, and may also provide oxygen barrier (OTR) depending upon the coating chemistry.

Generally, the pre- and post-metallization dispersion coating layers are used to sandwich an extremely thin layer of metal. The benefit is that, on the one hand, the pre-metallization layer creates an adequate medium for deposition of metal atoms and a barrier to oxygen and moisture, and on the other hand the post-metallization layer protects the metal layer from mechanical damages, particularly when the entire packaging material is bent, folded, or subject to mechanical stress such as during heat-sealing (when manufacturing and closing three-dimensional packaging items from said packaging material).

It was found by the inventors, that if one, or the other, of the pre- or post-metallization layer is missing around the metallic layer, or if the mechanical and adhesion characteristics of such layers are not appropriate, the barrier properties, the mechanical resistance and flexibility of the whole structure is lost. It was found that although the main role of the post-metallization layer is a mechanical reinforcement and flexibility enhancement of the structure, these effects are even further improved by the presence of the pre-metallization layer.

The packaging material of the present invention may be used to package products so that the metallized layer is located on the side of the paper layer that faces the product to be packaged. The product to be packaged may be a food product, for example.

In accordance with Codex Alimentarius the term food shall mean for the purpose of the present invention any substance, whether processed, semi-processed or raw, which is intended for human consumption, and includes drink, chewing gum and any substance which has been used in the manufacture, preparation or treatment of "food" but does not include cosmetics or tobacco or substances used only as drugs.

Thanks to polymer dispersion coating, the overall thickness of polymer material in the structure is extremely reduced compared to the thickness of paper material, therefore the inventors have achieved to overcome the technical limitations of the known multilayer barrier structures, and achieve a packaging multilayer structure with excellent barrier properties against oxygen and moisture transfer, while achieving a total contents of cellulosic fibres comprised preferably between 80% and 95% of the overall material weight. Furthermore, the low thickness of the dispersion coating of polymer avoids high cohesion and high adhesion of the polymer to the fibre, and therefore solves the recyclability problem (solid particles of polymer dispersed in a water carrier medium are easily separated from the fibre). The fact that the inventors succeeded in forming a multilayer structure completely deprived of polymer layers formed by extrusion (extrusion-lamination or extrusion coating), provides a multilayer structure with a ratio of cellulosic fibre to non-cellulosic material, which is extremely high in fibre contents, and wherein the polymer layers are easy to disintegrate in repulping process due to the relatively low cohesion strength of the polymer, and also the relatively low adhesion of the same polymer to the rest of the substrate (especially the cellulosic fibres). The resulting structure therefore demonstrates excellent repulping capabilities and high fibre yield which allows it to be accepted in waste paper collection in most of the countries. The very low content of non-cellulosic polymer and metal materials vacuum deposited metal layer is easily disintegrated, dissolved and separated from the cellulose, unlike existing structures known from the art.

In one embodiment of the present invention a printing layer may be applied on top of the paper layer.

One advantage of the metallized paper-based packaging material of the present invention is that it does not have to contain a polyolefin layer. As a consequence, the metallized paper-based packaging material is easier to recycle than paper-based packaging materials that comprise a polyolefin layer, such as a polyethylene (PE) layer or a polypropylene (PP) layer, for example.

Hence, the subject matter of the present invention also relates to a multi-layer metallized paper-based packaging material comprising, from its outer side (i.e. the surface outside of the packaging) to its inner side (i.e. the side in contact with the product to be enclosed in the package):
  a paper layer,
  a pre metallization coating layer
  a metallized layer, and
  at least one post metallization coating layer;
    wherein the multi-layer metallized paper-based packaging material does not comprise an extruded or laminated polyolefin layer.

It also relates to a multi-layer metallized paper-based packaging material comprising, from its outer side (i.e. the surface outside of the packaging) to its inner side (i.e. the side in contact with the product to be enclosed in the package):
  a paper layer,
  a pre metallization coating layer
  a metallized layer, and
  at least one post metallization coating layer;
    wherein the multi-layer metallized paper-based packaging material does not comprise a PE layer.

It further relates to a multi-layer metallized paper-based packaging material comprising, from its outer side (i.e. the surface outside of the packaging) to its inner side (i.e. the side in contact with the product to be enclosed in the package):
  a paper layer,
  a pre metallization coating layer
  a metallized layer, and
  at least one post metallization coating layer;
    wherein the multi-layer metallized paper-based packaging material does not comprise a PP layer, for example an extruded or laminated PP layer.

In one embodiment of the present invention, the multi-layer metallized paper-based packaging material of the present invention may consist of, from its outer side (i.e. the surface outside of the packaging) to its inner side (i.e. the side in contact with the product to be enclosed in the package):
  a paper layer,
  a pre metallization coating layer
  a metallized layer, and
  at least one post metallization coating layer.

In one preferred embodiment of the invention, the multi-layer paper-based packaging material comprises, from its outer side (i.e. the surface outside of the packaging) to its inner side (i.e. the side in contact with the product to be enclosed in the package):
  a paper layer having a grammage comprised within the range of to 120 g/m$^2$,
  a first pre-metallization dispersion coating layer comprising a compound of BVOH (representing 10% solid weight of the total material weight) and clay (representing 5% solid weight of the total material weight),
  a second pre-metallization dispersion coating layer comprising a BVOH (representing 10% solid weight of the total material weight),
  a metallized layer comprising vacuum deposited aluminium, or a thin-layer deposition of aluminium oxide (AlOx) or silicon oxide (SiOx), said layer having a thickness comprised within the range of 6 nm to 80 nm, a post-metallization dispersion coating layer comprising BVOH in an amount of 0.5 to 10 g/m².

The inventors were surprised to find that several (at least two) separate pre-metallization dispersion coating layers rather than only one, provides non-expected advantages, as follows.

Firstly, in order to maximize the planarization of the paper surface by application of a pre-metallization dispersion coating, it was found that the application of said pre-metallization coating layer in multiple passes yields a maximum benefit in terms of pin holes reduction. In other words, the effect of planarization of the paper surface, and closure of the pin holes in the paper surface, is augmented when the dispersion coating of the pre-metallization layer is done in several times. Furthermore, presence of the clay in the first layer of coating may further enhance surface coverage and planarization.

Preferably, a certain amount of time is given between applying two consecutive dispersion coating layers, such that one completely dries before the next one is applied.

Secondly, for the purpose of bringing oxygen barrier (OTR) functionality to the entire structure, in addition to moisture barrier (WVTR), it is needed to include specific layers that provide oxygen barrier. The first pre-metallization layer generally provides surface planarization and moisture barrier, and the second pre-metallization layer brings oxygen barrier. For oxygen barrier functionality, polymers such as PVOH and BVOH (in some cases also polyurethane (PU)) have been found to provide the best results. By having moisture barrier before the moisture sensitive coating such as PVOH and BVOH, detrimental effects of plastification at high relative humidity are avoided and high oxygen and high moisture barrier (above 60%) are achieved.

Thirdly, there are also economical or technical advantages in providing separate pre-metallization layers to the structure: oxygen barrier coating materials are expensive. If applied directly on paper in one layer, more coating material is required to cover the pinholes. This renders the overall amount of necessary oxygen barrier material more important is applied in one step, and increases the cost of the material to achieve a given barrier level. To solve this, a very thin first layer is applied onto the paper as a "base planarization" preparation layer, and then after drying, a second "barrier promoting" pre-metallization layer is applied onto the "preparation layer" (i.e. not directly onto the paper).

Fourthly, oxygen barrier coating materials often comprise a low content of dry solids, which makes them easier to be applied as a thinner layer, on top of another coating, rather than on top of the paper itself.

The use of BVOH as pre-metallization component, and BVOH (or alternatively bio-PBS or a blend of PBS and PBSA dispersion coating) as post-metallization, provides home compostability to the entire multi-layer structure because these two polymers, used in extremely low quantities, are also compatible with home compostability standards.

The multi-layer metallized paper-based packaging material may be a flexible multi-layer metallized paper-based packaging material. For the purposes of the present invention, a packaging material shall be considered flexible if it is a material capable of bending without breaking. Further, for example, such a flexible material may be a material that can be bent without breaking by hand. Typically, a multi-layer flexible packaging material in accordance with the present invention may have a basis weight of 140 g/m² or less.

People skilled in the art will be able to select an appropriate paper layer, for example, based on the product to be packaged, the intended shelf life and whether the paper material is to be used as primary, secondary or tertiary packaging.

The metallized layer can be applied to the packaging material by any method known in the art.

For example, in the multi-layer metallized paper-based packaging material in accordance with the present invention, the metallized layer may have a thickness in the range of about 20-500 nm, of about 20-400 nm, or of about 20-300 nm.

The metallized layer may have an equivalent optical density in the range of about 1-4, of about 1,2-3.9, or of about 1.4-3.8.

The metallized layer may be an aluminium layer, for example. The aluminium layer may be an aluminium oxide layer.

An aluminium layer may be applied to the packaging material by physical vapor deposition. For example, the aluminium layer may be applied by means of a vacuum deposition process. An example of a vacuum deposition process is described in Thin Solid Films, Volume 666, 30 Nov. 2018, Pages 6-14. Vacuum deposition is an evaporative process in which aluminium from a solid phase is transferred to the vapor phase and back to the solid phase, gradually building up film thickness. Coatings produced by vacuum deposition have the advantage of good abrasion resistance, impact and temperature strength, as well as the capability to be deposited on complex surfaces. The range of optical density for the aluminium layer may be in the range of 1.4-3.8, which correlates with a thickness of 30-200 nanometres.

A person skilled in the art may adjust the thickness of the aluminium layer appropriately, for example, depending on the intended shelf life, the packaged product and the overall thickness of the packaging material. In the multi-layer flexible packaging material in accordance with present invention, the aluminium layer may have a thickness in the range of 20-500 nm, 30-400 nm, or 50-200 nm, for example.

The packaging material of the present invention may be a packaging material for a food product. It may be a primary packaging material, a secondary packaging material or a tertiary packaging material, for example. If the packaging material is a packaging material for a food product, a primary packaging material for a food product may be a packaging material for a food product that is in direct contact with the actual food product. A secondary packaging material for a food product may be a packaging material for a food product that helps secure one or more food products contained in a primary packaging. Secondary packaging material is typically used when multiple food products are provided to consumers in a single container. A tertiary packaging material for a food product may be a packaging material for a food product that helps secure one or more food products contained in a primary packaging and/or in a primary and secondary packaging during transport.

In the packaging material of the present invention the post metallization coating layer may comprise a post-metallization tie layer coating. Tie layer coatings may be coatings that bonds two incompatible layers. The post-metallization tie layer coating used in the framework of the present invention may comprise an ethylene acrylic acid copolymer dispersion or other polyolefin dispersions. The polyolefin dispersions may be functionalized with methacrylic and/or with carboxyl acid groups.

An appropriate thickness of the post metallization coating layer may be determined by a person skilled in the art depending on the intended purpose of the packaging material. For example, the post metallization coating layer may be applied in an amount in the range of about 0.5-10 g/m$^2$, of about 2-8 g/m$^2$, or of about 5-7 g/m$^2$.

The post metallization coating layer of the packaging material in accordance with the present invention may further comprise a layer comprising ethylvinyl, butylvinyl and/or polyvinylalcohol copolymers. This layer may be applied on top of the post-metallization tie layer coating. The ethylvinyl, butylvinyl and/or polyvinylalcohol copolymers may be mineral filled. Typical mineral fillings that may be used for the purpose of the present invention include ground calcium carbonate, precipitated calcium carbonate, bentonite clay and other high-aspect ratio clays, talc, titanium dioxide, or combinations thereof. For example, such mineral fillings may have a particle size with a length in the range of about length 5-200 μm, with a width in the range of about 5-200 μm, and with a height in the range of about 0.1-100 μm. Using mineral filled copolymers for the purpose of the present invention has the advantage that this improves the wettability of the coatings, increases tortuosity of the coating and hence barrier properties, alters coefficient of friction, and ensures adhesion of the cold-seal latex adhesive.

The layer comprising ethylvinyl, butylvinyl and/or polyvinylalcohol copolymers that may be mineral filled may be present in an amount that may be adjusted to the purpose of the packaging material. For example, the multi-layer metallized paper-based packaging material in accordance with the present invention may comprise a post-metallization coating comprising a plain or mineral filled ethylvinyl, butylvinyl or polyvinylalcohol copolymer layer in an amount in the range of about 0.5-10 g/m$^2$, of about 1-8 g/m$^2$, or of about 2-5 g/m$^2$.

The packaging material in accordance with the present invention may further comprise as an inner layer a heat sealable coating. The inner layer is facing the packaged product. The heat sealable inner coating layer may comprise a propylene-based copolymer, a polylactic acid copolymer, vinyl-acetate, or combinations thereof. This heat sealable inner coating layer may be applied in an amount in the range of about 1-10 g/m$^2$. Such a heat sealable inner coating layer may have a coefficient of friction (coating to coating) of below 0.5 and/or a seal initiation temperature of above 70° C.

Additionally or alternatively, the last layer of coating may have a suitable polar and dispersive energy to act as a substrate for a cold seal latex adhesive.

The inventors have obtained very good results in terms of stability and maintenance of barrier properties, in particular under mechanical stress, with a multi-layer metallized paper-based packaging material in accordance with the present invention, comprising a pre-metallization primer coating in an amount of about 1-10 g/m$^2$, a metallization coating in an amount equivalent to an optical density in the range of about 1 to 4, a post-metallization tie layer coating in an amount in the range of about 0.25-9.75 g/m$^2$, and a layer comprising ethylvinyl, butylvinyl and/or polyvinylalcohol copolymers in an amount in the range of about 0.25-9.75 g/m$^2$.

For some applications of the present invention it may be preferred if the paper layer was non-porous. If the paper layer has a porous surface, an additional surface layer covering the porous paper surface may be added to make it air impermeable. Such an additional surface layer can comprise or consist of starch, pigment-starch or a pigment-latex formulation. The ratio of pore volume to total volume of the paper material is called the porosity of the paper material.

For the purpose of the present invention, a paper layer shall be considered as non-porous if a Gurley permeability is less than 20 ml/min (Tappi T547), if it has a porosity of less than 40%, for example, less than 30% or less than 20%. Hence, in one embodiment of the present invention, the paper layer is a non-porous paper layer.

It may also be preferred, if the paper layer had a low surface roughness. The inventors have found that a low surface roughness is beneficial for the purpose of the present invention. For example, the paper layer may have a Bendsten roughness of less than 100 ml/min. The Bendsten roughness can be determined in accordance with ISO 8791-2:2013, herewith incorporated herein by reference.

The thickness and stability of the paper used in the multi-layer metallized paper-based packaging material may be adjusted based on the intended purpose of the packaging material. Typically, a thicker paper may be used for a tertiary packaging that for a primary packaging. For example, the multi-layer metallized paper-based packaging material in accordance with the present invention may comprise a paper layer in an amount in the range of about 40-120 g/m$^2$.

Also, the overall thickness of the multi-layer metallized paper-based packaging material in accordance with the present invention may be adjusted by a person skilled in the art based on the intended purpose of the packaging material.

The multi-layer metallized paper-based packaging material in accordance with the present invention may have any thickness suitable for packaging materials. A person skilled in the art will be able to determine an appropriate thickness. Typically, however, if the packaging material is intended for use in packaging food products, the packaging material should be as thin as possible, while still ensuring safety and shelf life of the food product. For example, for food packaging it may be preferred if the multi-layer metallized paper-based packaging material in accordance with the present invention may have an overall thickness in the range of about 30-150 μm, 40-120 μm, or 50-100 μm.

The present inventors have obtained excellent resistance against mechanical stress with a multi-layer metallized paper-based packaging material in accordance with the present invention, wherein the packaging material comprises, from its outer side (i.e. the surface outside of the packaging) to its inner side (i.e. the side in contact with the product to be enclosed in the package):

a paper layer with a grammage in the range of about 40-120 g/m$^2$ and back side Bekk smoothness in the range of about 300-1000 seconds, a pre-metallization coating layer, wherein the pre-metallization coating layer is applied in an amount of about 1-10 g/m$^2$ and comprises an ethylene acrylic acid copolymer, an aluminium layer having a thickness in the range of 20-500 nm with an optical density of about 1-4.

a post-metallization tie layer coating, wherein the post-metallization tie layer coating is applied in an amount of about 0.5-10 g/m$^2$ and comprises an ethylene acrylic acid copolymer, and a post-metallization heat seal coating, wherein the post-metallization heat seal coating is applied in an amount of about 0.5-10 g/m$^2$ and comprising mineral filled polyvinyl alcohol.

In a preferred embodiment of the present invention, the multi-layer metallized paper-based packaging material in accordance with the present invention is recyclable in the paper recycling stream, because the polymer and metal coating can be easily separated from pulp fibres. During recycling, the aluminium layer will be separated from the

11 | 12 rest of the packaging. The fact that the subject matter of the present invention achieves it to omit a polyolefin layer, such as a PE or a PP layer, improves the sortability of the packaging material of the present invention during recycling. Typically, aluminium is separated from the rest of the packaging material during recycling in a hydra-pulper. Hence, the multi-layer flexible packaging material in accordance with the present invention may be recyclable as paper and/or carton.

One advantage of the subject matter of the present invention is it that despite omitting a polyolefin layer, such as a PE or a PP layer, excellent barrier properties are achieved. The multi-layer metallized paper-based packaging material in accordance with the present invention may have a water vapor transmission rate (WVTR) barrier of below 1 g/m²/day (23° C., 85% RH), for example of below 0.8 g/m²/day (23° C., 85% RH), further for example of below 0.5 g/m²/day (23° C., 85% RH) and/or an oxygen transmission rate (OTR) barrier below about 3 cm³/m²/day bar (23° C., 50% RH), for example of below about 1.5 cm³/m²/day bar (23° C., 50% RH), further for example of below about 1 cm³/m²/day bar (23° C., 50% RH). Remarkably, these excellent barrier properties are maintained after folding the packaging material in accordance with the present invention to 180° under 2 kilograms of compressive load in such a manner that the coating side of the paper is under compressive stress during folding.

These excellent barrier properties and excellent mechanical resistance to folding, allow it that the multi-layer metallized paper-based packaging material in accordance with the present invention may be used to package food.

Remarkably, the excellent barrier properties allow it that the multi-layer metallized paper-based packaging material in accordance with the present invention may be used to package dry food products. Dry food products include powders and granulates, for example powders and granulates to be reconstituted in milk or in water. Dry food products may have a water content of 5% or less, for example.

The subject matter of the present invention also extends to a food packaging comprising multi-layer metallized paper-based packaging material in accordance with the present invention.

For consumer information and design purposes an ink layer may be applied onto the outer surface of the paper layer. The ink may be applied using a rotogravure or a flexographic printing process, using water-based inks, for example.

It may be preferred, if there is a primer applied between paper layer and ink layer. Appropriate primers are known to the person skilled in the art, and may, for example, be a polyurethane primer.

In order to add a high quality finishing to the outer surface of the packaging material in accordance with the present invention an overprint varnish (OPV) may be applied to the surface of the ink layer. OPV are well-known to the person skilled in the art and may be chosen, e.g., according to the intended purpose of the packaging material of the present invention. For example, the OPV may be selected from the group consisting of conventional offset letterpress varnishes, acrylic varnishes, UV varnishes, and gravure varnishes which can be represented by water or solvent-based polymer formulations.

Those skilled in the art will understand that they can freely combine all features of the present invention disclosed herein. In particular, features described for the products of the present invention may be combined with the use of the present invention and vice versa. Further, features described for different embodiments of the present invention may be combined.

Although the invention has been described by way of example, it should be appreciated that variations and modifications may be made without departing from the scope of the invention as defined in the claims.

Furthermore, where known equivalents exist to specific features, such equivalents are incorporated as if specifically referred in this specification. Further advantages and features of the present invention are apparent from the figures and non-limiting examples.

EXAMPLES

FIG. 1 shows the schematic representation of multi-layer metallized paper structure which is comprised of paper, pre-metallization coating layer, metal layer and two different post metallization coating layers.

A paper substrate having grammage of 62 g/m² and back side Bekk smoothness of 650 seconds has been coated with a pre-metallization coating layer that comprises an ethylene acrylic acid copolymer. The pre-metallization coating layer has been applied onto the paper surface in amount equivalent to 4.5 g/m². Onto the coated paper an aluminium layer is deposited in an amount equivalent to an optical density of 3.5. The metallized paper is then coated with first layer of a post metallization coating in amount equivalent to 3.4 g/m². The first post metallization coating layer is comprised of an ethylene acrylic acid copolymer that is functionalized with methacrylic acid. A second coating layer is applied on top of the first post metallization coating layer in an amount equivalent to 2.9 g/m². The second post metallization coating layer is comprised of mineral filled ethylvinylalcohol copolymers.

The multi-layer metallized paper structure has been subjected to WVTR measurements @ 23° C. and 85% RH in both flat form as well as after 180° folding under 2 kgs compressive load in such a manner that the metallized side is under compressive stress. The samples have also been subjected to OTR measurements @ 23° C. and 50% RH. The results are shown in the table below:

| WVTR (23° C. & 85% RH) Flat - g/m²/day | WVTR (23° C. & 85% RH) Folded - g/m²/day | OTR (23° C. & 50% RH) Flat - cc/m²/day |
|---|---|---|
| 0.05 | 0.32 | 0.15 |

FIG. 2 shows the scanning electron microscopic (SEM) image of the cross section of the multi-layer metalized paper in folded condition. The SEM image demonstrates that there is no damage in the metallized paper structure after subjecting it to compressive stress by folding. The post metallization coating layers show a high degree of conformity to bending in the folding zone and protect the metal layer from getting damaged while folding. Consequently, the barrier resilience of the multi-layer metalized paper structure is found to be high.

The invention claimed is:

1. A multi-layer metallized paper-based packaging material comprising, from its outer side to its inner side:
   a paper layer having a grammage comprised in the range of 40 to 120 g/m², and wherein the paper layer has a back side Bekk smoothness in the range of about 300-1000 seconds,

at least one pre-metallization dispersion coating layer in an amount of about 1-10 g/m² and comprising an ethylene acrylic acid copolymer, a vacuum deposited metallization layer comprising an aluminium layer having a thickness in the range of 20-500 nm with an optical density of about 1-4, and at least one post-metallization dispersion coating layer in an amount in the range of about 0.5-10 g/m², wherein the at least one post-metallization dispersion coating layer comprises:

a post-metallization tie layer coating comprising an ethylene acrylic acid (EAA) copolymer dispersion functionalized with a methacrylic acid; and a copolymer layer comprising a plain or mineral filled ethylvinylalcohol (EVOH), butylvinyl alcohol (BVOH) or polyvinylalcohol (PVOH) copolymer layer applied on top of the post-metallization tie layer coating, wherein the multi-layer metallized paper-based packaging material has a WVTR barrier of below 1 g/m²·d (23° C., 85% RH) and/or an OTR barrier below about 3 cm³/m²·d·bar (23° C., 50% RH) after folding the material to 180° under 2 kilograms of compressive load in such a manner that the inner side of the material is under compressive stress during folding.

2. The multi-layer metallized paper-based packaging material in accordance with claim 1, wherein the copolymer layer is in an amount in the range of about 0.5-10 g/m².

3. The multi-layer metallized paper-based packaging material in accordance with claim 1, wherein the post-metallization tie layer coating is in an amount in the range of about 0.25-9.75 g/m², and the copolymer layer is in an amount in the range of about 0.25-9.75 g/m².

4. The multi-layer metallized paper-based packaging material in accordance with claim 1, wherein the multi-layer metallized paper-based packaging material has an overall thickness in the range of 30-150 μm.

5. The multi-layer metallized paper-based packaging material in accordance with claim 1, wherein the multi-layer metallized paper-based packaging material is recyclable as paper and/or carton.

6. The multi-layer metallized paper-based packaging material according to claim 1, wherein the copolymer layer comprises mineral filled ethylvinylalcohol copolymer.

7. The multi-layer metallized paper-based packaging material according to claim 1, wherein the paper layer has a Bendtsen roughness of less than 100 mL/min.

8. The multi-layer metallized paper-based packaging material according to claim 1, wherein the multi-layer metallized paper-based packaging material does not comprise an extruded or laminated polyolefin layer.

9. The multi-layer metallized paper-based packaging material according to claim 1, wherein the multi-layer metallized paper-based packaging material does not comprise a polyethylene layer.

10. The multi-layer metallized paper-based packaging material according to claim 1, wherein the multi-layer metallized paper-based packaging material does not comprise a polypropylene layer.

11. A food packaging comprising a multi-layer metallized paper-based packaging material, the multi-layer metallized paper-based packaging material comprising, from its outer side to its inner side:

a paper layer having a grammage comprised in the range of 40 to 120 g/m², and wherein the paper layer has a back side Bekk smoothness in the range of about 300-1000 seconds, at least one pre-metallization dispersion coating layer in an amount of about 1-10 g/m² and comprising an ethylene acrylic acid copolymer, a vacuum deposited metallization layer comprising an aluminium layer having a thickness in the range of 20-500 nm with an optical density of about 1-4, and at least one post-metallization dispersion coating layer in an amount in the range of about 0.5-10 g/m², wherein the at least one post-metallization dispersion coating layer comprises:

a post-metallization tie layer coating comprising an ethylene acrylic acid (EAA) copolymer dispersion functionalized with a methacrylic acid; and a copolymer layer comprising a plain or mineral filled ethylvinylalcohol (EVOH), butylvinyl alcohol (BVOH) or polyvinylalcohol (PVOH) copolymer layer applied on top of the post-metallization tie layer coating, wherein the multi-layer metallized paper-based packaging material has a WVTR barrier of below 1 g/m²·d (23° C., 85% RH) and/or an OTR barrier below about 3 cm³/m²·d·bar (23° C., 50% RH) after folding the material to 180° under 2 kilograms of compressive load in such a manner that the inner side of the material is under compressive stress during folding.

\* \* \* \* \*